Sept. 4, 1923.  1,467,255
J. THOMSON
ENGINE PISTON
Filed April 17, 1922   3 Sheets-Sheet 1
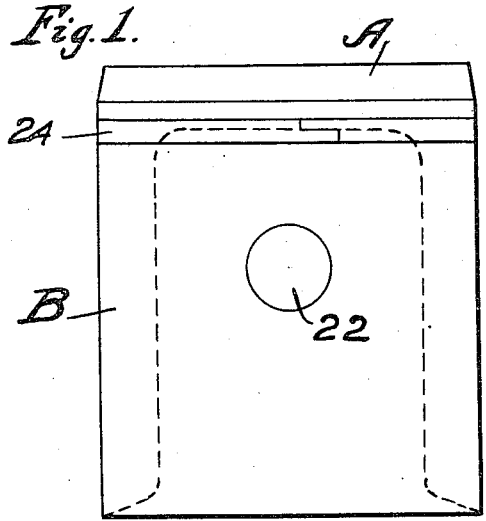
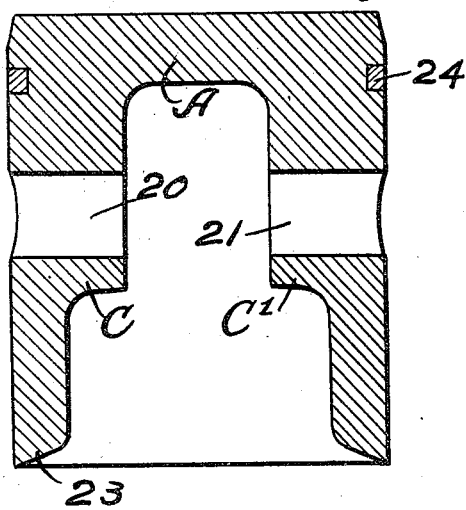
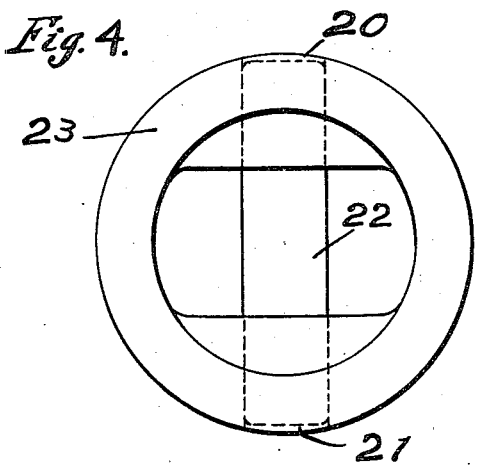
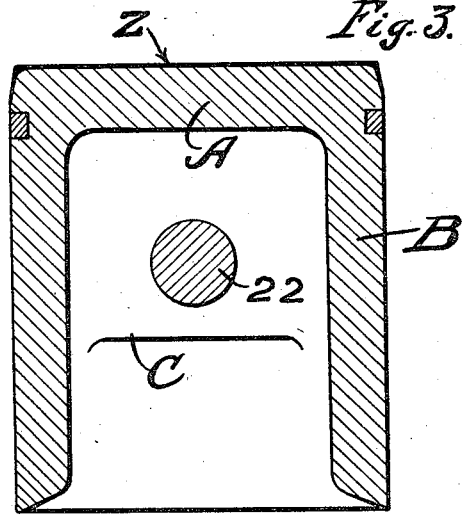
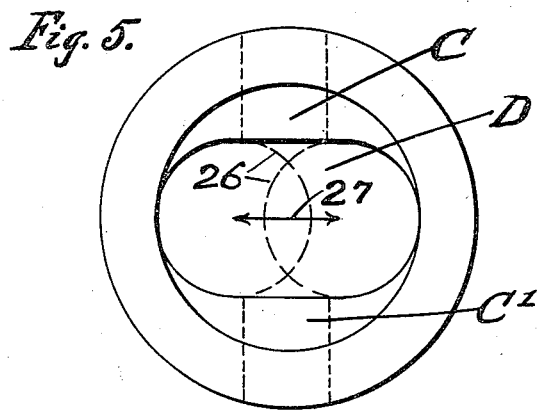
INVENTOR:
John Thomson

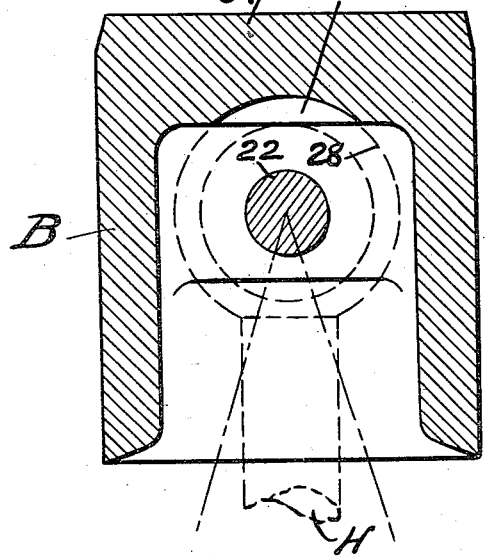
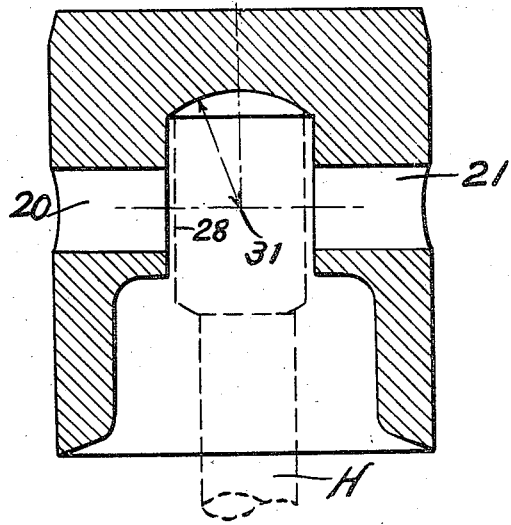
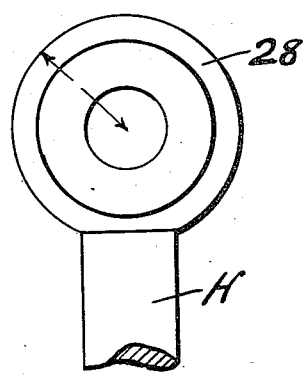
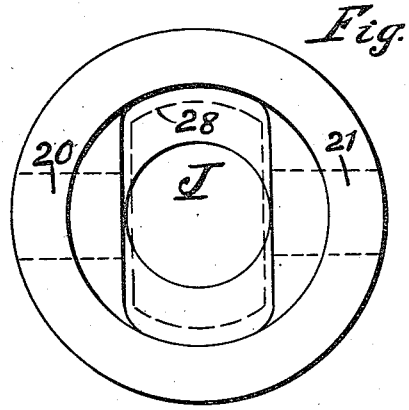
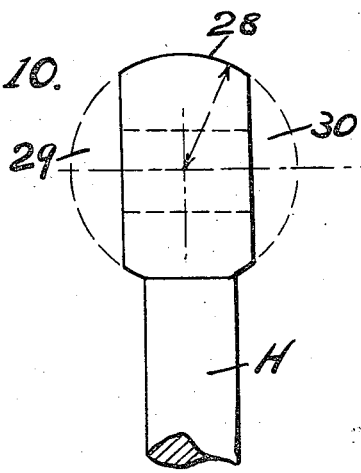
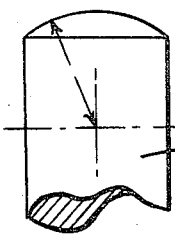

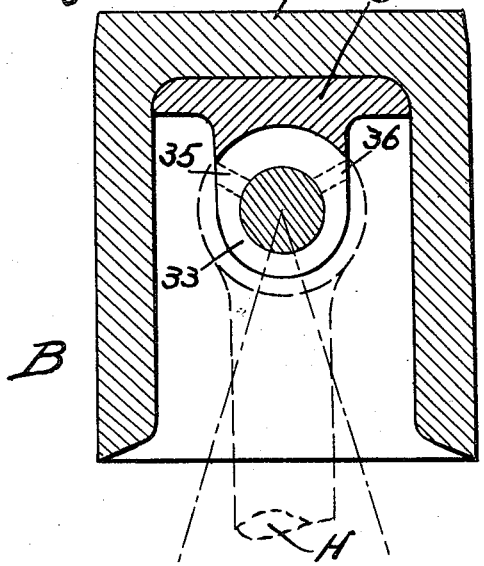
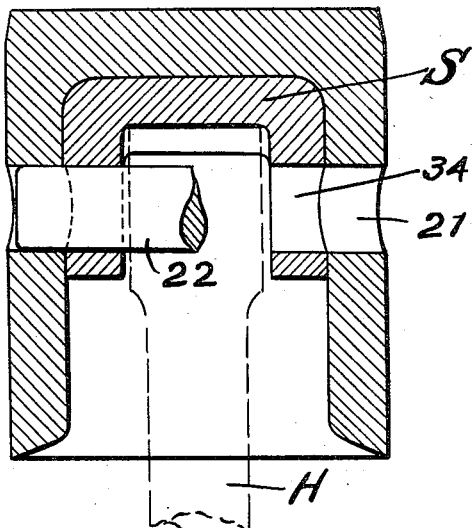
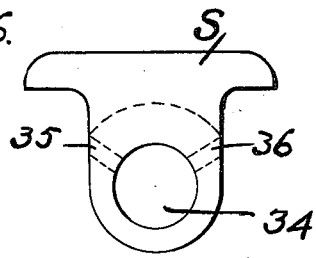
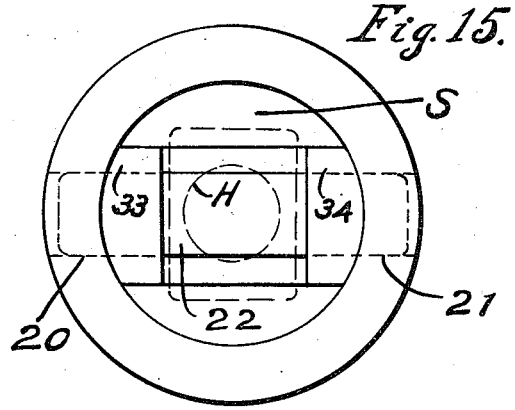
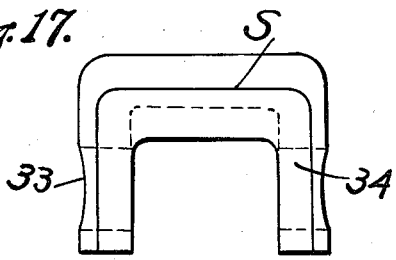

Patented Sept. 4, 1923.

1,467,255

UNITED STATES PATENT OFFICE.

JOHN THOMSON, OF BROOKLYN, NEW YORK.

ENGINE PISTON.

Application filed April 17, 1922. Serial No. 554,098.

*To all whom it may concern:*

Be it known that I, JOHN THOMSON, a citizen of the United States, and a resident of the borough of Brooklyn, city and State of New York, have invented an Engine Piston, of which the following is a specification.

The dominant feature of this invention consists in forming, as a new article of manufacture, a single acting engine-piston wholly composed, or essentially so, of monolithic carbon-graphite whose characteristic, or characteristics, will be hereinafter more definitely defined. The objects thereof are to substantially enhance the efficiency and diminish the cost, both as to production and maintenance, relative to the prior and existing state of the art.

The foregoing term, "monolithic carbon-graphite", is here used to distinguish amorphous carbon which has been extruded in the form of rods, slabs and the like or of which various parts may be formed by die-molding, the said carbon having a certain content of binding material, and which may be partially or wholly graphitized, as by the electric furnace process of Acheson. When thus treated, essentially all materials other than pure carbon, in its graphited form, or volatilized; and yet it remains solid, or monolithic, due to the heat-sintering, so to speak, of its molecular-like particles. As a lubricant, it stands a fairly good second to oil, especially so when the acting members effect a bearing of graphite-on-graphite. Its tensile strength is nominal but its crushing resistance is considerable, that is relative to metals. It is porous to the extent of about 25% of its volume, and this fact may be availed of to metallize the pores by forcing molten metal therein, whereby its tensile strength and crushing resistance are considerably increased. It is considerably elastic and resilient; and, if nearly pure, graphite does not actively oxidize ("air-burn") until a temperature of about 625° C., has been reached. It can readily be drilled, planed or turned to precise dimensions by ordinary machining operations. Its weight per cubic inch is fully a third less than that of aluminum, compared to which it is much less expensive, bulk for bulk. Prior to this applicant's present utilization of carbon-graphite, it was not a matter of common knowledge that such was feasible, on the contrary even many who are intimately familiar with the state of the art, both with respect of engine-pistons and in the production and fabrication of carbon-graphite, had not considered its use as a suitable material for such a purpose, whilst others were skeptical as to its probable utility if used.

This application for Letters-Patent for an engine-piston formed wholly, or essentially so, from monolithic carbon-graphite is based upon the foregoing state of facts; and upon the further fact that the desirability and utility thereof, as a thing new and useful, has been amply proven by reduction to practice.

In the drawings, which form a part of this specification.

Figure 1 is a vertical elevation of the engine-piston;

Figure 2 is a vertical, center section, lengthwise of the connecting rod pin bearings;

Figure 3 is a view similar to Figure 2, but transversely of the connecting rod pin and its bearings;

Figure 4 is an interior plan view, projected from the bottom of Figure 3.

Figure 5 is a plan view, similar to Figure 4, denoting a modification in the mode of construction;

Figure 6 is a vertical center section, transversely of the pin, denoting a modification;

Figure 7 is a view similar to Figure 6, but lengthwise of the pin-bearings;

Figure 8 is a plan view of the interior, projected from Figure 7;

Figure 9 is a detached full-line face view of a portion of the connecting rod and its head;

Figure 10 is a revolved side view of Figure 9;

Figure 11 is a broken detail view of a tool used in the construction of the piston, as in Figures 6, 7 and 8;

Figure 12 is a transverse section of Figure 11;

Figure 13 is a vertical, center section, transversely of the pin, denoting a further modification;

Figure 14 is a view similar to Figure 13, but lengthwise of the pin-bearings;

Figure 15 is a plan view of the interior, developed from Figure 14;

Figure 16 is a detached, end-elevation; and

Figure 17 is a side elevation of Figure 16, these views being of a part employed in Figures 13, 14 and 15.

In Figures 1, 2, 3, and 4, Sheet 1, the head A, the cylindrical portion B and the side-hubs C, C¹, are formed integrally, producing a monolithic structure, by molding carbon-graphite in a suitable metal die. The article thus treated is heat-treated, as may be desired; and also, if desired, metallized. At this stage, its dimensions are, so to speak, in the rough.

Following the foregoing maneuver, the transverse connecting rod pin-bearings, 20, 21, are drilled and reamed, to receive the pin 22; and the surface of the outer circumference, and of the head, and of the tube-face, 23, are machined to desired dimensions; also, if or when required, an ordinary iron, expansible piston-ring, as 24, may be applied. However, it is not essential that the piston shall be die-molded as it can be produced from carbon-graphite rods, metallized or not, by machining operations. For example, as depicted in Figure 5, the open end can be readily formed by drilling or boring, whilst the oblong cavity, D, between the bearing bosses, can also be readily formed by sinking therein and side-traversing a milling cutter, as shown by the dotted outlines, 26, and the line of traverse, 27.

In certain cases, as when the engine temperature averages high and the explosive reaction is incomplete leaving a residuum of oxygen, the head of the piston may be slowly oxidized to the impairment of its strength. To obviate this objection, the outer face and contiguous sloped sides of the head are protectable from "air-burning" by electrolytically depositing thereon a relatively thin film of metal, such as copper or nickel; which is denoted by the heavy line Z, Figure 3.

If or when required, the area of bearing surface between the piston and the connecting rod, H, can readily be augmented, as shown by Figures 6 to 12, inclusive, Sheet 2. In this instance, the head of the connecting rod is formed to the contour of a sphere, 28, having side-portions removed, as 29, 30, so that it will freely enter the space between the bearing-pin bosses. Then the bottom of the piston-cavity is machined, as J, to a spherical contour corresponding to that of the aforesaid head, except that it in fact is a spherical segment. In each case, the center of the spherical contour lies at the intersection of the axial centers of the piston and the connecting rod pin, as 31, Figure 7. This spherical segment can be readily produced, with accuracy both as to its contour and depth, by means of a formed end-mill, as 32, Figures 11 and 12. Thus, when the several parts are assembled, the connecting rod being attached tightly to the pin, the impelling pressure upon the piston is then borne partially by the pin in its cylindrical bearings and partially by the connecting rod head in its spherical bearing-cavity.

Again, as or when required, the connecting rod pin may be partially mounted in the wall of the piston and partially in an auxiliary metal bearing-member, as shown by Figures 13 to 17 inclusive, Sheet 3. In this case, the piston becomes simply a headed tube, which is well adapted to receive the prong-shaped metal piece, S, having pin bearings 33, 34, coinciding with those in the piston-wall. When the parts are assembled, the pin serves to securely lock the auxiliary metal piece to place, whereby the impelling thrust is imparted to and resisted by the composite bearings, the metal portion of which may be of any desired degree of hardness.

The metal portions of the pin bearing can be effectively lubricated, by oil automatically splashed from the engine crank-shaft, as note the oil-holes, 35, 36, Figure 16.

The head and tube-wall of the piston may be formed to such a thickness as will produce a structure amply sturdy for the contemplated duty, yet without being objectionable as to weight.

In primarily applying the piston to its cylinder, the latter being bored as truly cylindrical as is commercially feasible, the piston should fit the bore, when the engine is cold, fairly snugly. As a consequence thereof, when first operated, particles of graphite will be ruptured from the piston and transferred to the cylinder. Again, when the engine becomes normally heated, the piston will expand correspondingly and exert further diametral pressure upon the cylinder, causing an additional removal and transfer of carbon-graphite, which will continue until the said side-pressure has become so relieved that further removal ceases. Meantime, the graphite-acting-upon-graphite will produce mirror-like surfaces with so light a side-pressure, or so slight a side-clearance, that the joint-closure will be a much closer approximation to "practical perfection" and subtend an endurance, both as to the piston and its cylinder, as cannot otherwise be attained.

What I claim is:

1. As a new article of manufacture, a single acting engine-piston, provided with transverse connecting rod pin bearings, wholly formed of monolithic carbon-graphite, as and for the purpose herein specified.

2. As a new article of manufacture, a single acting engine-piston wholly formed of monolithic carbon-graphite whose impelling impulse is transferred to the connecting rod partially from the head of the connecting rod itself and partially through its pin.

3. As a new article of manufacture, a single acting engine-piston whose head and tubular portion are wholly formed of monolithic carbon-graphite, the impelling impulse to the connecting rod being partially transferred to its pin by bearings in the said tubular portion and by bearings in an interior metallic member, the latter being locked to the piston by the said pin.

4. As a new article of manufacture, a single acting engine-piston, provided with suitable connecting rod pin bearings and formed of monolithic carbon-graphite, the outer surface of its head having thereon a relatively thin electrolytic deposition of metal, such as copper or nickel, as and for the purpose herein set forth.

This specification signed this first day of December, A. D., 1921.

JOHN THOMSON.